(12) United States Patent
Narang et al.

(10) Patent No.: US 6,248,480 B1
(45) Date of Patent: Jun. 19, 2001

(54) HIGH TEMPERATURE POLYMER ELECTROLYTES

(75) Inventors: Subhash Narang, Palo Alto; Susanna Ventura, Los Altos, both of CA (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 09/340,778

(22) Filed: Jun. 28, 1999

Related U.S. Application Data

(60) Provisional application No. 60/109,154, filed on Nov. 20, 1998, and provisional application No. 60/091,051, filed on Jun. 29, 1998.

(51) Int. Cl.⁷ ............................ H01M 10/40; C08G 75/00
(52) U.S. Cl. .................... 429/314; 429/315; 429/316; 429/317; 528/171; 528/172; 528/173; 528/183; 528/337
(58) Field of Search ..................... 429/311, 314, 429/315, 316, 317; 252/62.2; 528/171, 172, 173, 183, 337

(56) References Cited

U.S. PATENT DOCUMENTS

| | | | |
|---|---|---|---|
| 4,797,457 | * 1/1989 | Guiver et al. ............ | 528/171 X |
| 5,312,876 | 5/1994 | Dang et al. .............. | 525/435 |
| 5,312,895 | * 5/1994 | Dang et al. .............. | 528/171 X |
| 5,378,550 | * 1/1995 | Doddapaneni et al. ...... | 252/62.2 X |
| 5,403,675 | * 4/1995 | Ogata et al. . | |
| 5,548,055 | * 8/1996 | Narang et al. . | |
| 5,558,959 | * 9/1996 | Venugopal et al. . | |
| 5,602,185 | 2/1997 | Stone et al. ............. | 521/27 |
| 5,633,098 | * 5/1997 | Narang et al. . | |
| 5,741,408 | * 4/1998 | Helmer-Metzmann et al. . | |
| 5,886,130 | * 3/1999 | Trimmer et al. .......... | 528/171 |
| 6,087,031 | * 7/2000 | Iwasaki et al. .......... | 429/314 X |

\* cited by examiner

*Primary Examiner*—Stephen Kalafut
(74) *Attorney, Agent, or Firm*—Fish & Associates, LLP; Robert D. Fish; Sandra Pateat Thompson

(57) ABSTRACT

An electrolyte is provided having a backbone that includes a plurality of aromatic constituents coupled together by at least one atom having a π-cloud, and in which a halogen atom and an ion exchange group are covalently bound directly to the backbone. Furthermore, the electrolyte is high temperature resistant and may comprise perhalogenated polymers, including perhalogenated polyphenylenes, perhalogenated polyamides, perhalogenated aromatic polyesters, perhalogenated polyimide, etc. Still further, the electrolyte may have acidic groups as ion exchange groups, including sulfonic acid groups, or phosphoric acid groups.

21 Claims, 10 Drawing Sheets

HIGH TEMPERATURE POLYMER ELECTROLYTES

This application claims the benefit of U.S. provisional application No. 60/091,051 filed Jun. 29, 1998 incorporated herein by reference in its entirety and a Provisional No. 60/109/154 filed Nov. 20, 1998.

FIELD OF THE INVENTION

The field of the invention is polymer electrolytes.

BACKGROUND OF THE INVENTION

Most electrolytic cells and fuel cells utilize at least one cathode and one anode in an electrochemical reaction. Typically, a separator keeps a cathode and anode physically separated, and an electrolyte enables electrochemical contact between the two electrodes. In some instances, the separator and the electrolyte are two distinct functional elements. For example, NaCl electrolysis typically employs an asbestos diaphragm or a mercury intermediate electrode as a separator, and a highly alkaline NaCl solution as the electrolyte. However, utilizing a separator and a liquid electrolyte often has many disadvantages. Configurations with an electrolyte and a separator frequently require considerable space. Moreover, liquid electrolytes are often highly corrosive and pose potential leakage problems of the cell with subsequent loss of the electrolyte. Another problem with a liquid electrolyte is that such electrolytes tend to become readily contaminated.

In a polymer electrolyte, the separator and the electrolyte are combined in a single physical component. Generally, a polymer electrolyte carries ion exchange groups, such as sulfonate or phosphonate groups, on a polymeric structure. Depending on the molecular design of the polymer electrolyte, a single ion or an ion pair can migrate through the polymer. The use of polymer electrolytes is advantageous, because electrolysis cells or fuel cells can be configured in various space saving ways. Furthermore, since the polymer electrolyte is not liquid, leakage problems with consequent loss of the electrolyte are typically not encountered.

Many polymer electrolytes, such as poly(ethylene oxide)- and poly(propylene oxide) based compounds, or polysulfone- and polyvinylidene compounds, are relatively inexpensive and can be utilized in various applications. However, some of these electrolytes have relatively low ion conductivity and chemical stability limiting their practicability. Other polymer electrolytes are stable only at relatively low temperatures.

Low temperature stability is especially undesirable, because many electrochemical reactions can be run more efficiently at higher temperatures. For example, the efficiency of water electrolysis benefits from an increase in temperature due to a decrease in the thermodynamic potential and a decrease in electrode polarization. Temperatures in the range of 150° C. to 250° C. are particularly desirable because such temperatures allow for an excellent carbon monoxide tolerance. Moreover, temperatures in the range of 150° C. to 250° C. would enable the direct oxidation of ethanol, other alcohols and hydrocarbons.

To circumvent at least some problems of the low temperature stability, perfluorinated hydrocarbon sulfonate ionomers, such as Nafion™ (a perfluorinated hydrocarbon with sulfonic acid groups), have been developed. However, despite their enhanced chemical and thermal stability many difficulties still persist. One problem is that perfluorinated hydrocarbon sulfonate ionomers are relatively expensive. Another problem is that such ionomers tend to decompose at temperatures of about 80° C. and above when they are used over a prolonged period of time.

In recent years, new high temperature polymer electrolytes with improved physicochemical properties have been synthesized. For example, U.S. Pat. No. 5,548,055 and U.S. Pat. No. 5,633,098, both to Narang et al., demonstrate polymer electrolytes based on polysiloxanes and poly (alkylene oxides) with improved plasticity. In another example, U.S. Pat. No. 5,312,895 and U.S. Pat. No. 5,312,876, both to Dang, rigid "rod-type" para-ordered high temperature polymer electrolytes with solubility in water or in aprotic solvents are shown. In a further example, in U.S. Pat. No. 5,741,408 to Helmer-Metzmann, the author shows that the stability of a high temperature polymer electrolyte can be improved by cross-linking polymer electrolyte strands. In a still further example, in U.S. Pat. No. 5,403,675 to Ogata and Rikugata, high temperature polymer electrolytes, such as sulfonated rigid-rod polyphenylenes, are presented that can even operate in the absence of liquid water.

Significant progress in high temperature polymer electrolytes has been achieved with respect to thermal stability and mechanical properties. However, high temperature polymer electrolytes still suffer from a serious disadvantage. Almost all, or all high temperature polymer electrolytes contain aromatic hydrogen atoms that are prone to oxidation, which eventually leads to a decrease in performance and a loss of chemical and structural stability. Therefore, there is still a need to provide improved methods and compositions for electrochemically stable high temperature polymer electrolytes.

SUMMARY OF THE INVENTION

In accordance with the present inventive subject matter, compositions and methods are provided in which an electrolyte has a backbone that includes a plurality of aromatic constituents coupled together by at least one atom having a π-cloud, and in which a halogen atom and an ion exchange group are covalently bound directly to the backbone.

In one aspect of a preferred class of embodiments, the haloaromatic polymer electrolytes are high temperature resistant haloaromatic polymer electrolytes. In a more preferred class, the high temperature resistant haloaromatic polymer electrolytes comprise perhalogenated polyphenylenes, perhalogenated phenylene ethers, perhalogenated polyamides, perhalogenated polyesters, perhalogenated aromatic polycarbonates, perhalogenated polysulfones, perhalogenated polyurethanes, perhalogenated polyureas, perhalogenated polyimides, perhalogenated polybenzazoles, perhalogenated polyquinoxalines, or perhalogenated polyquinolines. In an even more preferred class, the perhalogenated polymers are perfluorinated polymers.

In another aspect of preferred embodiments, the haloaromatic polymer electrolytes have acidic groups as ion exchange groups, and in a more preferred class, the acidic groups are sulfonic acid groups, or phosphoric acid groups.

Various objects, features, aspects and advantages of the present invention will become more apparent from the following detailed description of preferred embodiments of the invention.

DETAILED DESCRIPTION

Figure 1A:
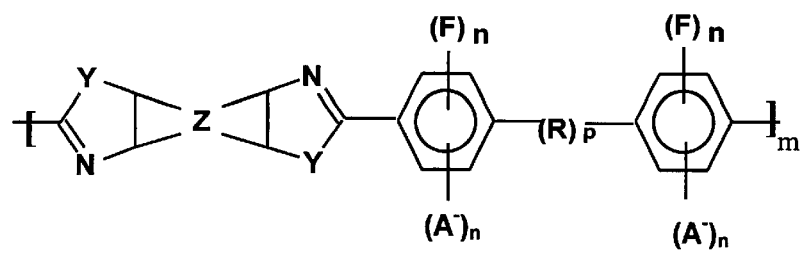
FIGS. 1A–1F show various examples of electrolytes according to the inventive subject matter.
Figure 1B:
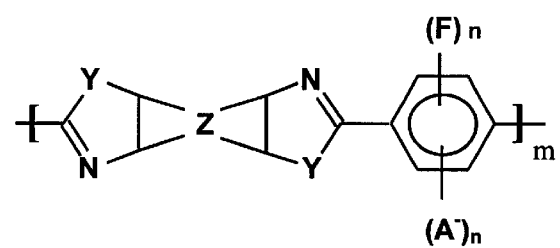
Figure 1C:
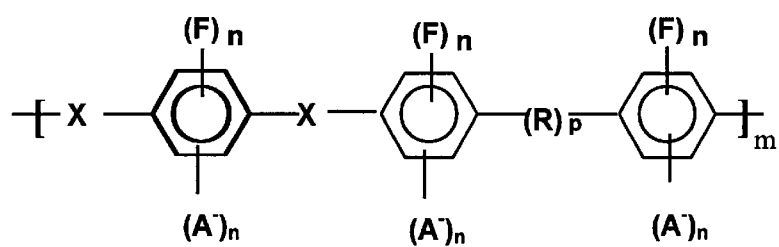
Figure 1D:
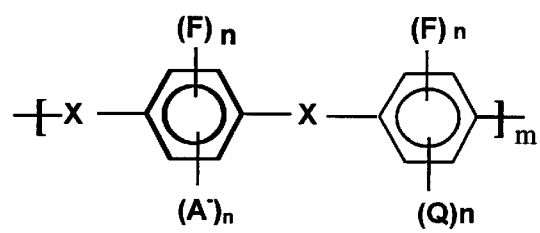
Figure 1E:
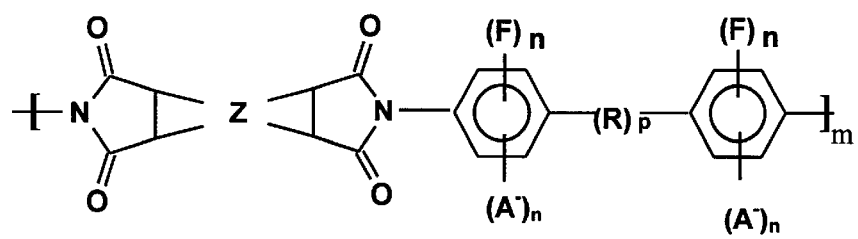
Figure 1F:
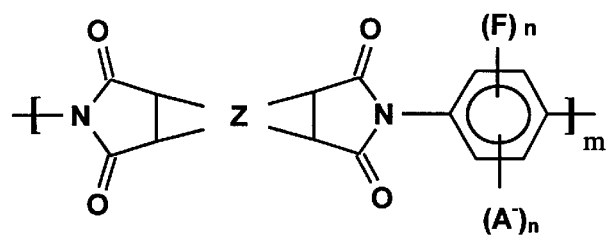

As used herein, the term "electrolyte" refers to a nonmetallic electric conductor in which current is carried by the movement of ions.

As used herein, the term "backbone" refers to a contiguous chain of atoms or constituents that form a strand, wherein the atoms or constituents are covalently bound such that removal of any of the atoms or constituents would result in interruption of the chain.

As used herein, the term "aromatic constituent" refers to a planar and ring-shaped chemical group, wherein (a) each atom of the ring has a π orbital, (b) the π orbitals are perpendicular to the plane of the ring, and (c) the number of π-electrons in the ring is 4n+2 (where n=0, 1, 2, etc.).

As used herein, the term "π-cloud" refers to a π-orbital of an atom. Such π-orbitals can be oriented perpendicular to, or in the same space axis as other π-orbitals, and may therefore be conjugated with other π-orbitals. Furthermore, contemplated π-orbital may be occupied with 0, 1, or 2 electrons in at least some resonance structure.

As further used herein, the term "ion exchange group" includes any chemical group that is capable of transitorily and non-covalently binding an ion wherein the charge of the ion is opposite to the charge of the ion exchange group. Contemplated ions are typically alkaline-, alkaline earth-, and transition metal ions, but appropriate ions may also include various other ionic species, such as hydrogen ions, charged organic and inorganic compounds. It is further contemplated that more than one ion exchange group may be involved in binding of a single ion. Similarly, it is contemplated that more than one ion may be bound by a single ion exchange group.

In a preferred embodiment, the electrolyte is a poly(perfluoroethersulfone)sulfonic acid, in which the backbone is a polyethersulfone, the aromatic constituents are 2,3,5,6-tetrafluourophenylene and 2,3,5,6-tetrasulfono-1,4-hydroquinone, and the ion exchange groups are negatively charged sulfonic acid groups. The aromatic constituents are coupled together by an oxygen ether group and a sulfone group.

In alternative embodiments, many backbones other than a polyethersulfone are contemplated, including polymeric backbones. Alternative polymeric backbones include homopolymers, heteropolymers, and blockpolymers. Appropriate polymeric backbones are, for example, a poly(phenylene ether), an aromatic polyamide, an aromatic polycarbonate, an aromatic polyimide, an aromatic polyurea, an aromatic polyurethane, and aromatic polyester, a polybenzazole, a polyquinoxaline, and a polyquinoline. With regard to the repeating units in the polymeric backbone, it is contemplated that the polymeric backbone may be made entirely of aromatic constituents, or may comprise aromatic constituents only in certain parts. When the backbone is made of two or more aromatic constituents linked together by an atom having a π-cloud, it is especially contemplated that the aromatic constituents form a conjugated aromatic system. It is also contemplated that alternative backbones comprise components other than a plurality of organic constituents coupled together by at least one atom having a π-cloud. For example, contemplated components are organic and inorganic material, such as plasticizers, fire retardants, and polysiloxanes. The molecular weight of contemplated backbones may vary considerably and may lie within a range between about 200 Da–2,000,000 Dalton, or more. With respect to the configuration of alternative backbones, various structures including linear, branched, and three-dimensional structures are contemplated.

In further alternative embodiments, a wide variety of aromatic constituents other than a tetra-fluorophenylene and a tetrasulfohydroquinone are contemplated, including 5-membered rings, 6-membered rings, annelated, or condensed ring systems that may or may not have heteroatoms. For example, preferred alternative aromatic constituents are difluorodisulfoterephthalic acid, perfluorophenylsulfone, and tetrafluorophenylenediamine. It is further contemplated that alternative aromatic constituents may also carry at least one halogen atom other than a fluorine. For example, appropriate aromatic constituents may carry fluorine, chlorine, bromine, or iodine, or any chemically reasonable combination thereof. In other alternative embodiments, halogen atoms may be attached to positions in the electrolyte other than the aromatic constituent, including the backbone, and the atom that couples two aromatic constituents together. Although various degrees of halogenation of the aromatic constituents are contemplated, it is preferred that aromatic constituents are perhalogenated, and even more preferred that aromatic constituents are perfluorinated. In still further alternative embodiments, additional functional groups may be coupled to the aromatic constituent, including electron withdrawing groups. For example, electron withdrawing groups are —Cl, —$NO_2$, —CN, —$COR_1$, —$SOR_1$, —$SO_2R_1$, —$COOR_1$, and $CF_3$, wherein $R_1$ comprises an aromatic group.

With respect to the ion exchange group, various groups other than sulfonic acid groups are contemplated, including various anionic and cationic ion exchange groups. Alternative cationic ion exchange groups are, for example, quaternary ammonium groups. Alternative anionic ion exchange groups comprise inorganic and organic groups with an acidic proton. For example, appropriate inorganic ion exchange groups include phosphoric acid groups, and appropriate organic ion exchange groups include perfluorophenols, sulfonyl(trifluoromethylsulfonyl)imide, and sulfonylbis(trifluoromethylsulfonyl)methide. It is also contemplated that more than one type of ion exchange group may be employed in a single electrolyte, i.e. one electrolyte may have both phosphoric acid groups and sulfonic acid groups as cationic ion exchange groups. Although in preferred embodiments all ion exchange groups are coupled to an aromatic constituent, various other positions for ion exchange groups in the electrolyte are contemplated, including the ion exchange group comprising part of the backbone. Moreover, the number of ion exchange groups is not fixed to a certain amount, but may vary substantially among different electrolytes.

In preferred embodiments, an oxygen atom and a sulfur atom couple two aromatic constituents together via an ether group and a sulfone group, respectively. However, in alternative embodiments, many atoms other than sulfur and oxygen are contemplated, including nitrogen and carbon. Furthermore, more than one atom may be involved in coupling aromatic constituents, so long as all such atoms have a #-cloud. For example, aromatic constituents may be coupled via atoms in a keto group, an amide group, a urea group, a urethane group, an ester group, a sulfide, a sulfone group, a perfluoroalkylene group, etc. In addition, such coupling groups can further be modified with electron withdrawing groups.

It is contemplated that alternative electrolytes can also be formulated from blends, interpenetrating or semi-interpenetrating networks containing the described polymers, or by preparing composites of the described polymers with ceramics, such as alumina or silica, or ceramers. Alternative electrolytes may further be composites at molecular level of described polymers with a ceramic network. Semi-interpenetrating electrolyte networks may be prepared by admixing an acidic polymer electrolyte with a basic polymer, such as polybenzoimidazole or polybenzotriazole, to form a pseudo-crosslinked polymer mixture. It is further contemplated that pseudo-crosslinking takes place between the ion exchange groups of the high temperature polymer electrolytes and the basic groups of the basic polymer, thus producing water-insoluble polymer films with good mechanical stability. Furthermore, semi-interpenetrating electrolyte networks may be prepared by admixing an acidic polymer electrolyte with a suitable amount of organic compounds carrying multiple basic groups, including triazine or benzotriazole. Alternatively, alkaline-earth metal ions or transition metal ions, including calcium ions, and platinum ions may be used for pseudo crosslinking.

A collection of exemplary electrolytes according to the inventive subject matter is depicted in FIGS. 1A–1F, and is intended to illustrate but not to limit the inventive subject matter. In all of FIGS. 1A–1F, X=O, S, NHCO, COO, CONH, OCO, O(CO)O, NHCONH, NHCOO; R=CO, $SO_2$, S, O, Rf (perfluoralkylene), ORf, RfO, ORfO; R1=aromatic group; A$^-$=perfluorophenyl, sulfonyl(trifluoromethylsulfonyl)imide, sulfonylbis(trifluoromethylsulfonyl)methide, $SO_3^-$, $PO_3^{31}$ . Q=CL, $NO_2$, CN, $COR_1$, $SOR_1$, $SO2R_1$, $COOR_1$, $CF_3$; Z=fluorinated aromatic group optionally containing electron-withdrawing group (Some of the fluorine atoms may be replaced by the electron-withdrawing group Q); p=integer>zero; n=0–6; and m=integer>zero.

EXAMPLES

Figure 2:
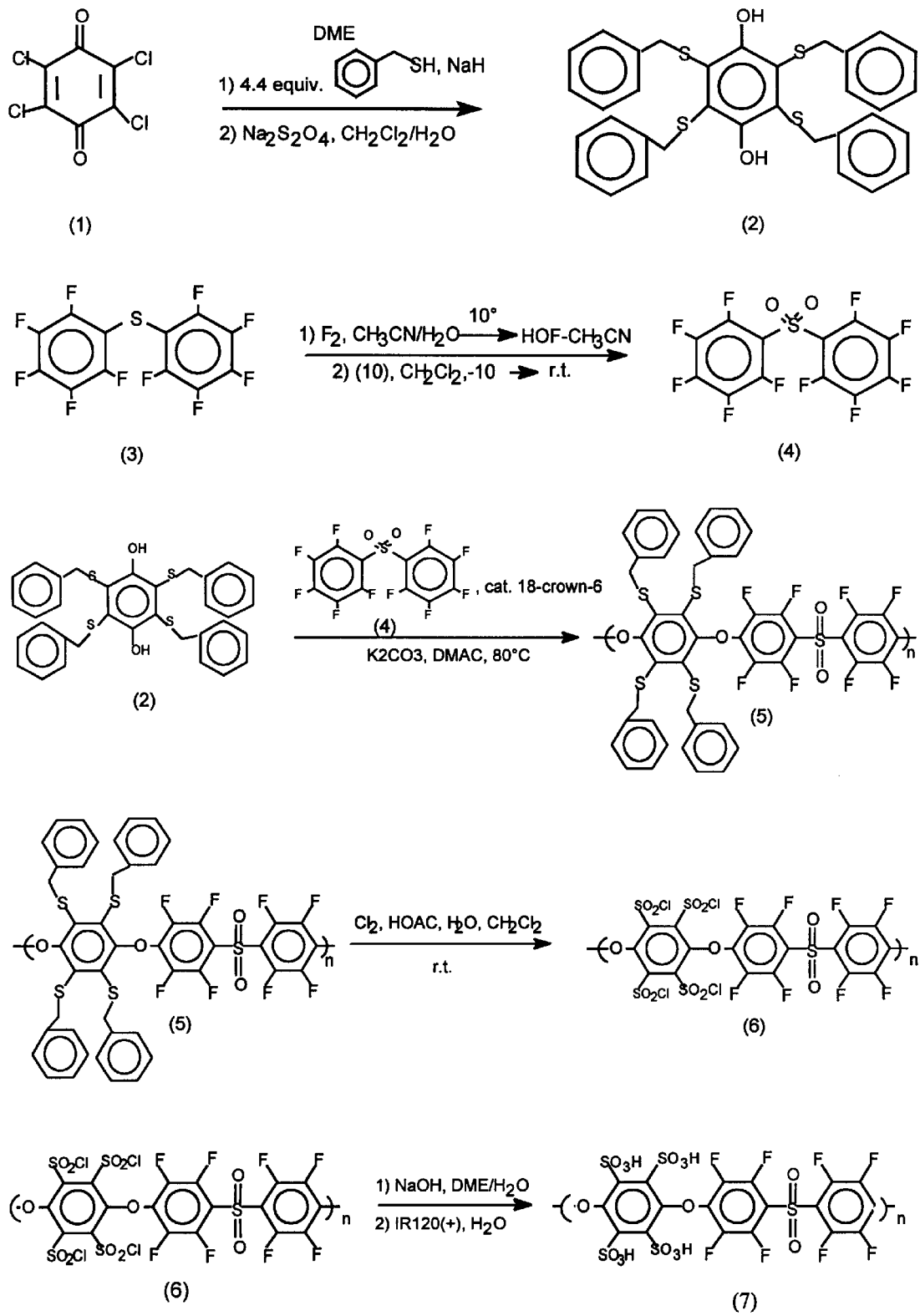
FIG. 2 is a scheme depicting the synthesis of a first electrolyte according to the inventive subject matter.
Figure 3:
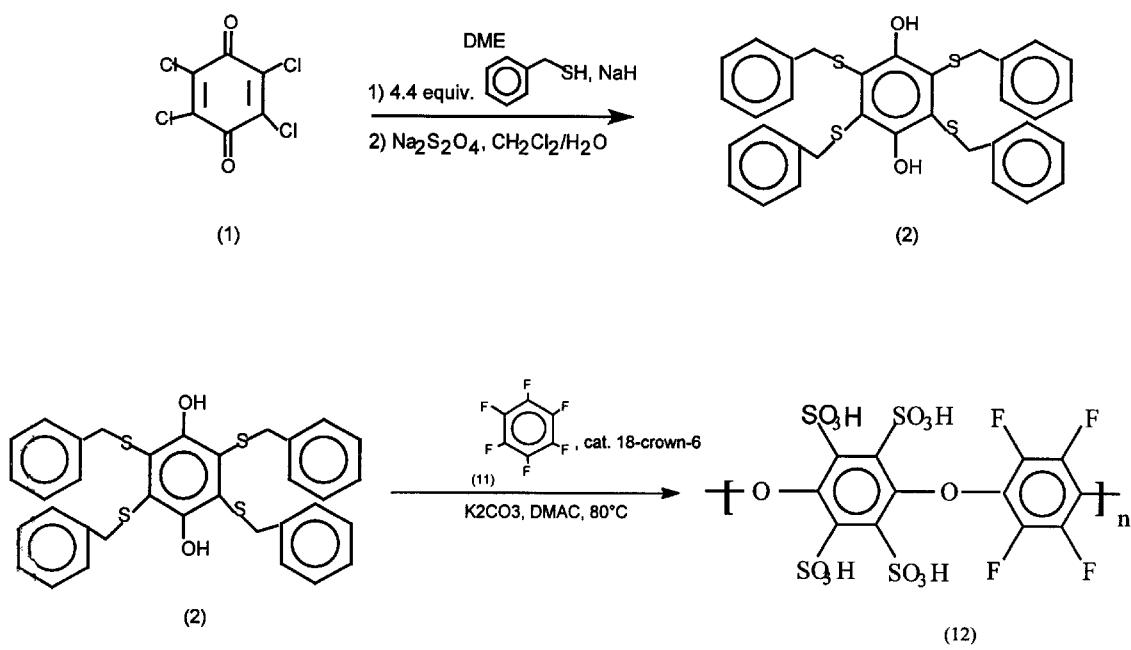
FIG. 3 is a scheme depicting the synthesis of a second electrolyte according to the inventive subject matter.
Figure 4:
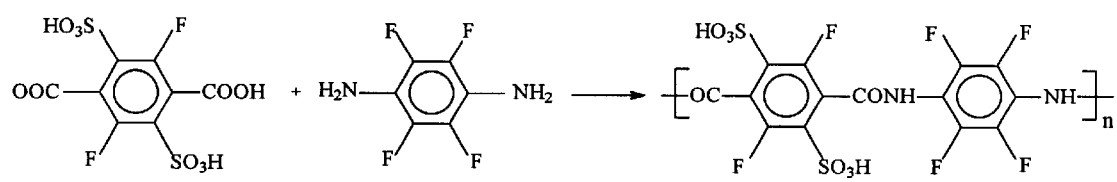
FIG. 4 is a scheme depicting the synthesis of a third electrolyte according to the inventive subject matter.
Figure 5:
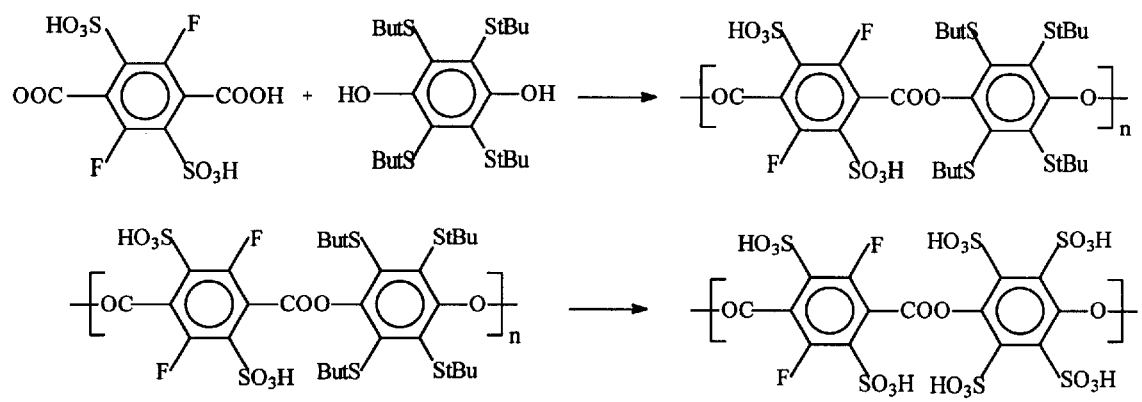
FIG. 5 is a scheme depicting the synthesis of a fourth electrolyte according to the inventive subject matter.
Figure 9:
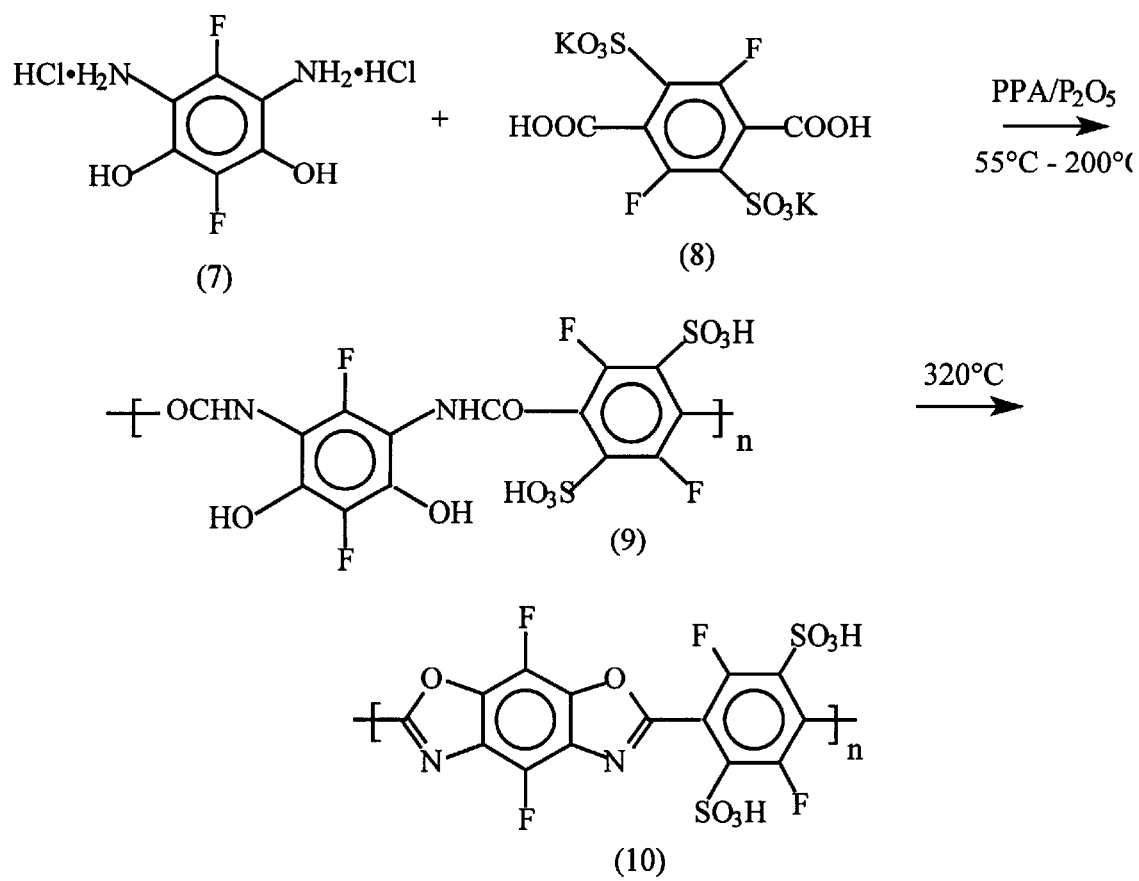
FIG. 9 is a scheme depicting the synthesis of an eighth electrolyte according to the inventive subject matter.

The following examples describe the synthesis of poly (perfluoroethersulfone) sulfonic acid (7), poly (perfluoroether) sulfonic acid (12), and perfluorodisulfopolybenzoxazole (10), which is schematically depicted in FIG. 2, FIG. 3, and FIG. 9, respectively. Further examples of a synthesis of high temperature polymer electrolytes according to the inventive subject matter are depicted in FIGS. 4–8. Still further examples describe the preparation of films from electrolytes according to one aspect of the inventive subject matter, and measurement of their conductivities.

Example 1

Synthesis of 2,3,5,6-tetrathiobenzyl-1,4-hydroquinone (2)

To a 15° C. cooled mixture of 4.92 g (20.0 mmol) of chloranil (1) and 10.6 mL (90.0 mmol) of benzyl mercaptan in 230 mL of ethylene glycol dimethyl ether (DME) was added 3.9 g (97 mmol, 60% in mineral oil, washed with hexanes) of sodium hydride in portions over 20 minutes under an atmosphere of Argon. The mixture was allowed to stir at room temperature over night and was concentrated in vacuo. The residue was dissolved in dichloromethane and shaken for 5 minutes with 17.5 g (85 mmol 85%) of sodium hydrosulfite in water in a separatory funnel. The dichloromethane layer was separated, washed with water and brine, dried ($MgSO_4$), filtered, and concentrated to 18.7 g of the crude product mixture. Purification by flash column chromatography on 150 mL of silica gel (1:1 $C_6H_{14}/CH_2Cl_2$ eluant) followed by crystallization from diethyl ether afforded 6.96 g (57%) of (9) as a colorless solid. $^1$H NMR ($CDCl_3$)δ3.87 (s, 8 H, $SCH_2$), 7.00–7.30 (m, 2 O H, aryl).

Synthesis of bis(pentafluorophenyl)sulfone (4)

According to the procedure adapted by S. Rozen, et al. (R. Beckerbauer, B. E. Smart, Y. Bareket, S. Rozen, J. Org. Chem. 1995; 60, 6186–6187) for the oxidation of electrodeficient sulfides to sulfones using HOF—$CH_3CN$, a mixture of 700 ml of acetonitrile and 70 ml of water was cooled to 10° C. in a $CO_2/CCl_4$ cooling bath and a 10% fluorine 90% $N_2$ gas mixture was bubbled in slowly for 50 minutes. The gas was stopped, and a mixture of 2.00 g (5.46 mmol) of bis(pentafluorophenyl)sulfide (3) dissolved in 70 ml of cold chloromethane was added all at once. The cooling bath was removed and the mixture was allowed to warm to room temperature and stir over night. The solvent was room temperature and stirred over night. The solvent was evaporated and the residue was neutralized with saturated sodium bicarbonate and extracted with dichloroethane, washed with water, dried (MgSO4), filtered, and concentrated to 2.23 g of the crude product, purification by flash column chromatography on 50 ml of silica gel and elution with 3:2 hexanes-dichloromethane afforded 2:14 g (98%) of (4) as a colorless solid. $^{19}$F NMR ($CDCl_3$): δ-136 (d, J=20 Hz, 4 F),−141 (M,2 F),−157.9 (t, J=20 Hz, 4 F)

Copolymerization of 2,3,5,6-tetrathiobenzyl-1,4-hydroquinone (2) and bis(pentafluorophenyl) sulfone (4)

According to the procedure adapted by R. Kellmen, et al.(R. Kellman, R. F. Williams, G. Dimotsis, D. J. Gerbi, and J. C. Williams, ACS Symp. Ser., 1987, 326 (Phase Transfer Catal.: New Chem, Catal., Appl.) 128–142) for the nucleophilic aromatic substitution in condensation polymerization catalyzed by solid liquid phase transfer, a mixture of 2.70 g (4.50 mmol) of 2,3,5,6-tetrathiobenzyl-1,4-hydroquinone (2) and 1.79 g (4.50 mmol) of bis(pentafluorophenyl) sulfone (4) was treated with 2.69 g (19.5 mmol) of anhydrous potassium carbonate and 0.33 g (1.26 mmol) of 18-crown-6 in 22 ml of N,N-dimethylacetamide and the mixture was heated at 80° C. for 18 h with stirring under an atmosphere of Argon. The mixture was concentrated in vacuo, extracted with dichloromethane, washed with aqueous sodium dihydrogenphosphate and water, dried ($MgSO_4$), filtered, and concentrated to 4.73 g of gold-colored solid. $^1$H NMR ($CDCl_3$: δ3.90–4.00 (br s, $CH_2S$), 6.90–7.30 (br m, aryl).

Synthesis of poly(perfluoroethersulfone) sulfonyl chloride (6)

Using a procedure developed for the conversion of dialkylsulfides into alkanesulfonyl chlorides, 4.7 g of the polymer (5) was dissolved in 28 ml of dichloromethane, a mixture of 50 ml of acetic acid and 6.6 ml of water was added, and the mixture was treated with chlorine bubbled through the solution, maintaining the reaction at room temperature, for 15 hr. Excess chlorine was removed under aspirator pressure, and the product mixture was extracted with dichloromethane, washed with 6×250 ml of water and brine, dried (MgSO$_4$), filtered, and concentrated to afford 4.85 g of gold-colored solid, which was hydrolyzed without further purification.

Synthesis of poly(perfluoroethersulfone) sulfonic acid (7)

To a mixture of 4.84 g of the polysulfonyl chloride (6) in 75 ml of DME was added 1.46 g (36.0 mmol) of sodium hydroxide in 20 ml of water dropwise with stirring at 15° C. The mixture was stirred for two hours at room temperature and concentrated in vacuo. The mixture was treated with 30 g of IR120(+) in water with stirring for two hours, passed through an additional 15 g of resin, and concentrated in vacuo to 3.1 g of the crude product mixture. The crude product was dissolved in 20 ml of methanol, filtered and added to 400 ml of diethyl ether with stirring and the supernatant was discarded. The solid polymer was triturated with dichloromethane and ethyl acetate and dried to afford 2.64 g (75%) of (7) as a tan powder.

Example 2

Poly(perfluoroether)sulfonic acid (FIG. 3) was prepared starting from the copolymerization of 2,3,5,6-tetrathiobenzyl-1,4-hydroquinone (2) with hexafluorobenzene (11). The copolymer was then oxidized to the correspondent sulfonyl chloride, and hydrolyzed to the sulfonic acid.

Example 3

Poly(perfluorodisulfophenylene amide) (FIG. 4) was synthesized from the polycondensation of tetrafluorophenylenediamine with 2,5-disulfo-3,6-difluoroterephthalic acid in freshly prepared polyphosphoric acid. The starting material, 2,5-disulfo-3,6-difluoroterephthalic acid, was prepared in three steps. Initially tetrafluoro-p-xylene was reacted with two equivalents of sodium benzylthiolate in dimethylformamide. The resulting aromatic sulfide was reduced to the corresponding aryl mercaptan upon heating in n-butanol in the presence of metallic sodium. The resulting 2,5-difluoro-3,6-dimercapto p-xylene was then oxidized to 2,5-difluoro-2,6-disulfolterephthalic acid dipotassium salt by reaction with potassium permanganate.

Example 4

Poly(perfluorosulfophenylene ester) (FIG. 5) was synthesized by polycondensation of disulfodifluoroterephthalic acid with 2,3,5,6-tetrathio-t-butyl-1,4-hydroquinone. The reaction was performed in dimethylacetamide at reflux for fifteen hours. The polymer was precipitated in methanol. After drying, the resulting polymer was suspended in a mixture of acetic acid, water and methylene chloride and treated with chlorine gas at room temperature. Chlorine was passed through the mixture for about 30 minutes, till the slurry became a homogeneous solution. After solvent evaporation, the sulfonylchloride polymer was hydrolyzed to correspondent sulfonic acid polymer.

Example 5

Figure 6:
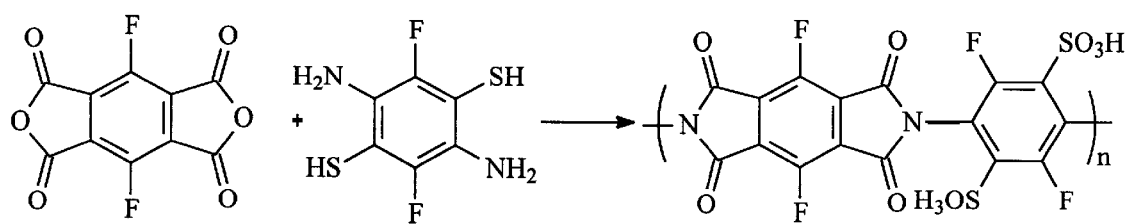
FIG. 6 is a scheme depicting the synthesis of a fifth electrolyte according to the inventive subject matter.

Poly(perfluoroimide)sulfonic acid was prepared as shown in FIG. 6. One of the starting materials, 2,5-difluoro-3,6-dimercapto-phenylenediamine, was prepared according to the procedure described in Macromolecules 14, 916 (1981), starting from 25-difluoro-phenylenediamine. 2,5-Difluoro-3,6-dimercapto-phenylenediamine was polycondensed with perfluorophthalic anhydride by heating in dimethylacetamide. The resulting perfluorodimercapto polyimide was oxidized and converted to the correspondent perfluorodisulfo polyimide as described in the example 2.

Example 6

Figure 7:
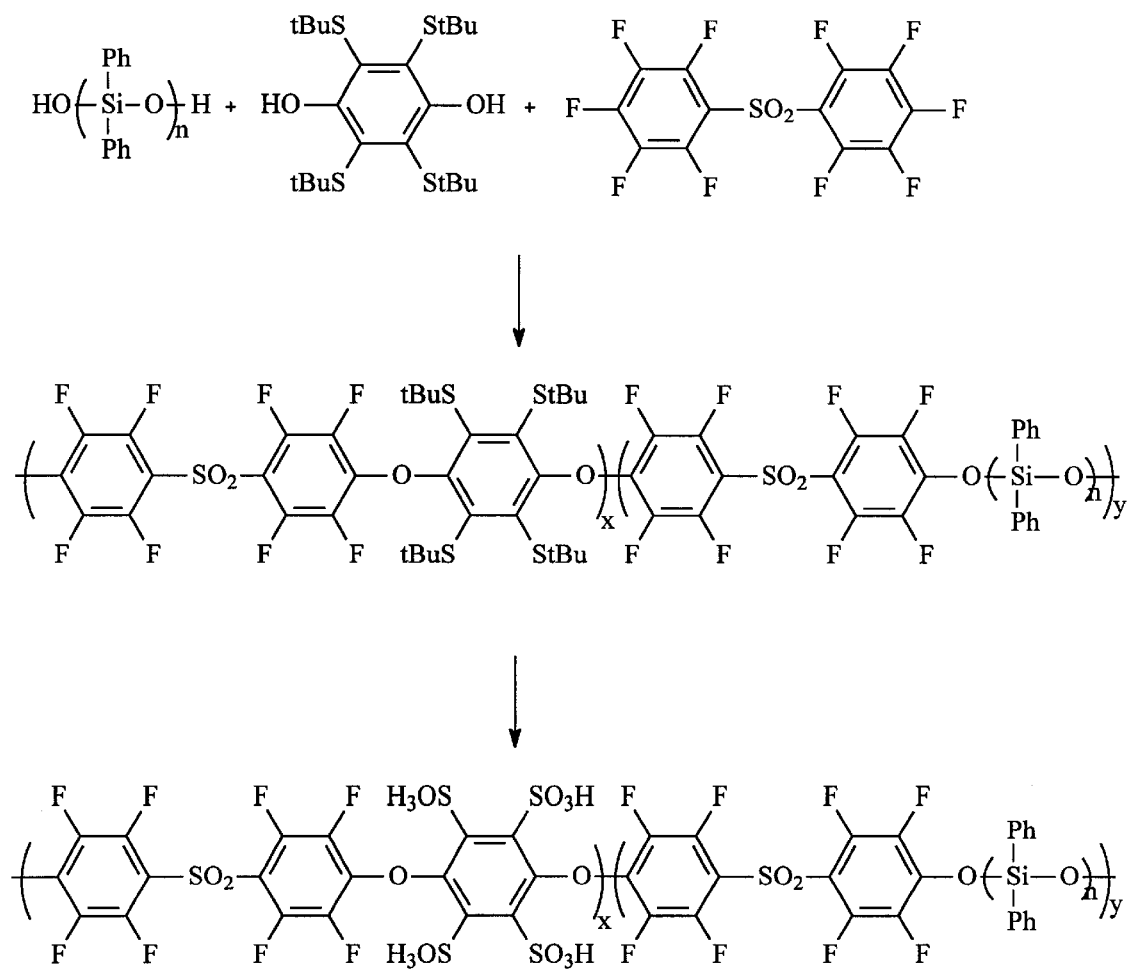
FIG. 7 is a scheme depicting the synthesis of a sixth electrolyte according to the inventive subject matter.
Figure 8:
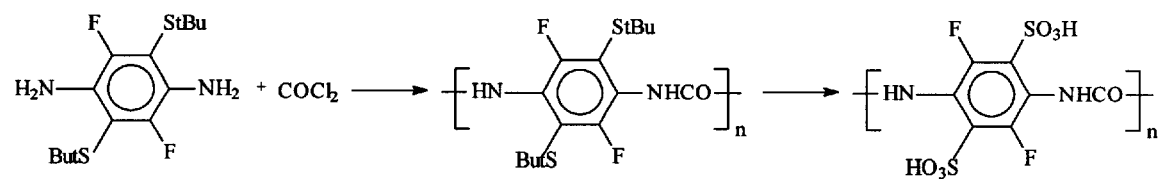
FIG. 8 is a scheme depicting the synthesis of a seventh electrolyte according to the inventive subject matter.

As shown in FIG. 7, hydroxy-terminated diphenylsiloxane (Gelest, Inc.) and 2,3,5,6-tetrathio-tert-butyl-1,4,-hydroquinone were copolymerized with bis (pentafluorophenyl)sulfone on dimethylacetamide in the presence of potassium carbonate and 18-crown-6 at 80° C. with stirring under argon for fifteen hours. The resulting terpolymer was isolated by solvent evaporation and washing with warm water. The polymer was further oxidized and converted to the corresponding sulfonic acid polymer as described in example 2.

Example 7

Poly(perfluorodisulfo phenylurea) (FIG. 8) was prepared by addition of phosgene to a solution of 2,5-difluoro-3,6-bisthio-tert-butyl-1,4-phenylenediamine in tetrahydrofuran and pyridine cooled at −20° C. The mixture was stirred for one hour at 0° C., the excess of phosgene as removed by displacement with nitrogen, and the solid product was filtered. The polymer, isolated from the organic layer, was oxidized and converted to the resulting sulfonic acid as described in example 2.

Example 8

Perfluorodisulfo-polybenzoxazole (FIG. 9) was synthesized from the polycondensation of dihydrochloride difluorodiamino p-hydroquinone (7) with disulfodifluoroterephthalic acid (8) in freshly prepared PPA using P$_2$O$_5$ adjustment method. Initially, the o-hydroxy polyamide prepolymer (9) was formed. Upon heating at 320° C., the prepolymer was cyclized to the final perfluorodisulfo-polybenzoxazole (10).

Example 9

Fabrication of poly(perfluoroethersulfone)sulfonic acid films and poly(perfluoroether)sulfonic acid films.

Films of polymer (7) and (12) were fabricated by solvent casting from a solution in dimethylformamide on a 60 μm thick glass fiber non-woven membrane. The polymer films were initially dried at 80° C., then transferred into a furnace for thermal curing. The polymer films were heated under argon at a rate of 20° C./hour from room temperature to a temperature of 250° C. The films were held at 250° C. for 8 hours, then cooled at a rate of 20° C./hour to room temperature.

Example 10

Poly(perfluoroethersulfone)sulfonic acid polymer was dissolved in dimethylacetamide and a small amount of triethylamine. The solution was then added dropwise to a solution of polybenzimidazole in dimethylacetamide. The resulting solution was cast over a thin nonwoven glass fiber separator and dried at 60° C. After drying at 60° C., the polymer film was examined by scanning electron microscopy (SEM). No cracks were observed for films prepared from blends containing polybenzimidazole and the poly (perfluoroethersulfone)sulfonic acid polymer in molar ratio of 1:1 or higher. The films were then heated under argon at 220° C. for 15 hours and again examined by SEM. No cracks were observed.

Example 11

Poly(perfluoroimide)sulfonic acid was dissolved in dimethylacetamide, triethylamine and a small amount of 10% NaOH. The solution was then added dropwise to a solution of polybenzimidazole in dimethylacetamide. The resulting solution was cast over a thin nonwoven glass fiber separator and the film was dried at 100° C. under vacuum. The film was then soaked in 0.5 M HCl for 18 hours and repeatedly washed in water before testing.

Example 12

Conductivity of poly(perfluoroethersulfone) sulfonic acid

The polymer films were transferred into four electrode conductivity cells where they were held at 100° C. at 100% relative humidity over a few hours for hydration. The proton film conductivity of poly(perfluoroethersulfone) sulfonic acid was found to be 0.05 S/cm at 200° C.

Thus, specific embodiments and applications of high temperature polymer electrolytes have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. An electrolyte having a polymeric backbone that includes a plurality of aromatic constituents coupled together by at least one atom having a π-cloud, and in which a halogen atom and an ion exchange group are covalently bound directly to the backbone, wherein the ion exchange group is selected from the group consisting of a sulfonic acid, or a phosphoric acid a perfluorophenol, a sulfonyl (trifluoromethylsulfonyl)imide, and a sulfonylbis (trifluoromethyl)methide.

2. The electrolyte of claim 1, wherein the polymeric backbone is selected from the group consisting of a poly (phenylene ether), an aromatic polyamide, an aromatic polycarbonate, an aromatic polyester, an aromatic polyurea, an aromatic polyurethane, an aromatic polysulfone, an aromatic polyimide, a polybenzazole, a polyquinoxaline, and a polyquinoline.

3. The electrolyte of claim 2, wherein the polymeric backbone is selected from the group consisting of a perfluoro poly(p-phenylene oxide), a perfluorosulfo poly(p-phenylenesulfide), a perfluorosulfo poly(p-phenylenesulfone), a perfluorosulfo organic polyamide, a perfluorosulfo aromatic polycarbonate, a perfluorosulfo aromatic polyimide, a perfluorosulfo aromatic polyester, a perfluorosulfo aromatic polyurea, a perfluorosulfo aromatic polyurethane, a perfluorosulfo aromatic polysulfone, a perfluorosulfo polybenzazole, a perfluorosulfo polyquinoxaline, and a perfluorosulfo polyquinoline.

4. The electrolyte of claim 1, wherein the backbone comprises a phenylene.

5. The electrolyte of claim 1, wherein the backbone comprises at least one heteroatom.

6. The electrolyte of claim 5, wherein the heteroatom is selected from the group consisting of an oxygen, a nitrogen, a sulfur, and a phosphorus.

7. The electrolyte of claim 1, wherein the at least one atom having a π-cloud is selected from the group consisting of a carbon, a nitrogen, an oxygen, a sulfur, and a phosphorus.

8. The electrolyte of claim 1, wherein the halogen atom is a fluorine atom.

9. The electrolyte of claim 1, further comprising an electron withdrawing group.

10. The electrolyte of claim 9, wherein the electron withdrawing group is selected from the group consisting of —Cl, —NO$_2$, —CN, —COR$_1$, —SOR$_1$, —SO$_2$R$_1$, —COOR$_1$, CF$_3$, wherein R$_1$ comprises an aromatic group.

11. The electrolyte of claim 10, wherein the electron withdrawing group is covalently bound to at least one of the plurality of the aromatic constituents.

12. The electrolyte of claim 1, wherein the backbone is conjugated.

13. The electrolyte of claim 1, wherein the electrolyte is conjugated.

14. A polymer electrolyte film comprising a mixture of 1% to 99% by weight of a high temperature polymer electrolyte according to claim 1 and a basic polymer.

15. The polymer electrolyte film of claim 14 wherein the high temperature polymer electrolyte comprises poly (perfluoroethersulfone)sulfonic acid.

16. The polymer electrolyte film of claim 14 wherein the basic polymer comprises polybenzimidazole.

17. The polymer electrolyte film of claim 14, further comprising an organic polybasic compound or a metal ion.

18. The polymer electrolyte film of claim 17 wherein the organic polybasic compound comprises a triazine or a benzotriazole.

19. The polymer electrolyte film of claim 17 wherein the metal ion is an alkaline earth metal ion or a transition metal ion.

20. The polymer electrolyte film of claim 17 wherein the alkaline earth metal ion is a calcium ion.

21. The polymer electrolyte film of claim 17 wherein the transition metal ion is a platinum ion.

* * * * *